United States Patent
Mitchell

(10) Patent No.: US 9,436,452 B2
(45) Date of Patent: Sep. 6, 2016

(54) METHOD FOR ENFORCING LANGUAGE SUBSETS

(71) Applicant: Keysight Technologies, Inc., Minneapolis, MN (US)

(72) Inventor: Kevin Mitchell, Edinburgh (GB)

(73) Assignee: Keysight Technologies, Inc., Santa Rosa, CA (US)

( * ) Notice: Subject to any disclaimer, the term of this patent is extended or adjusted under 35 U.S.C. 154(b) by 208 days.

(21) Appl. No.: 13/674,859

(22) Filed: Nov. 12, 2012

(65) Prior Publication Data

US 2014/0137088 A1    May 15, 2014

(51) Int. Cl.
*G06F 9/45* (2006.01)
(52) U.S. Cl.
CPC .................................... *G06F 8/53* (2013.01)
(58) Field of Classification Search
CPC ............ G06F 8/427; G06F 8/43; G06F 8/53; G06F 8/41; G06F 8/447
USPC ........................................................ 717/143
See application file for complete search history.

(56) References Cited

U.S. PATENT DOCUMENTS

| | | | |
|---|---|---|---|
| 2006/0069688 A1* | 3/2006 | Shekar | G06F 17/30286 |
| 2006/0184829 A1* | 8/2006 | Cheong et al. | 714/39 |
| 2008/0184204 A1 | 7/2008 | Tigani | |
| 2009/0172650 A1* | 7/2009 | Spurlin | 717/144 |
| 2011/0023016 A1* | 1/2011 | Khader et al. | 717/120 |
| 2011/0302564 A1 | 12/2011 | Byers | |

* cited by examiner

*Primary Examiner* — Li B. Zhen
*Assistant Examiner* — Hui-Wen Lin

(57) ABSTRACT

A method of operating a data processing system to examine a compiled program for violations of a set of rules that do not constitute violations detected by the compiler that generated the program. The method includes obtaining a restricted rule set defined in terms of rules in a decompiled representation of the program. The method also includes decompiling the compiled program to the decompiled representation of the compiled program in which the restricted rule set is defined, examining the decompiled representation of the compiled program for a violation of the restricted rule set to determine if any of the rules are violated, and providing an output indicating that one of the rules was violated.

14 Claims, 1 Drawing Sheet

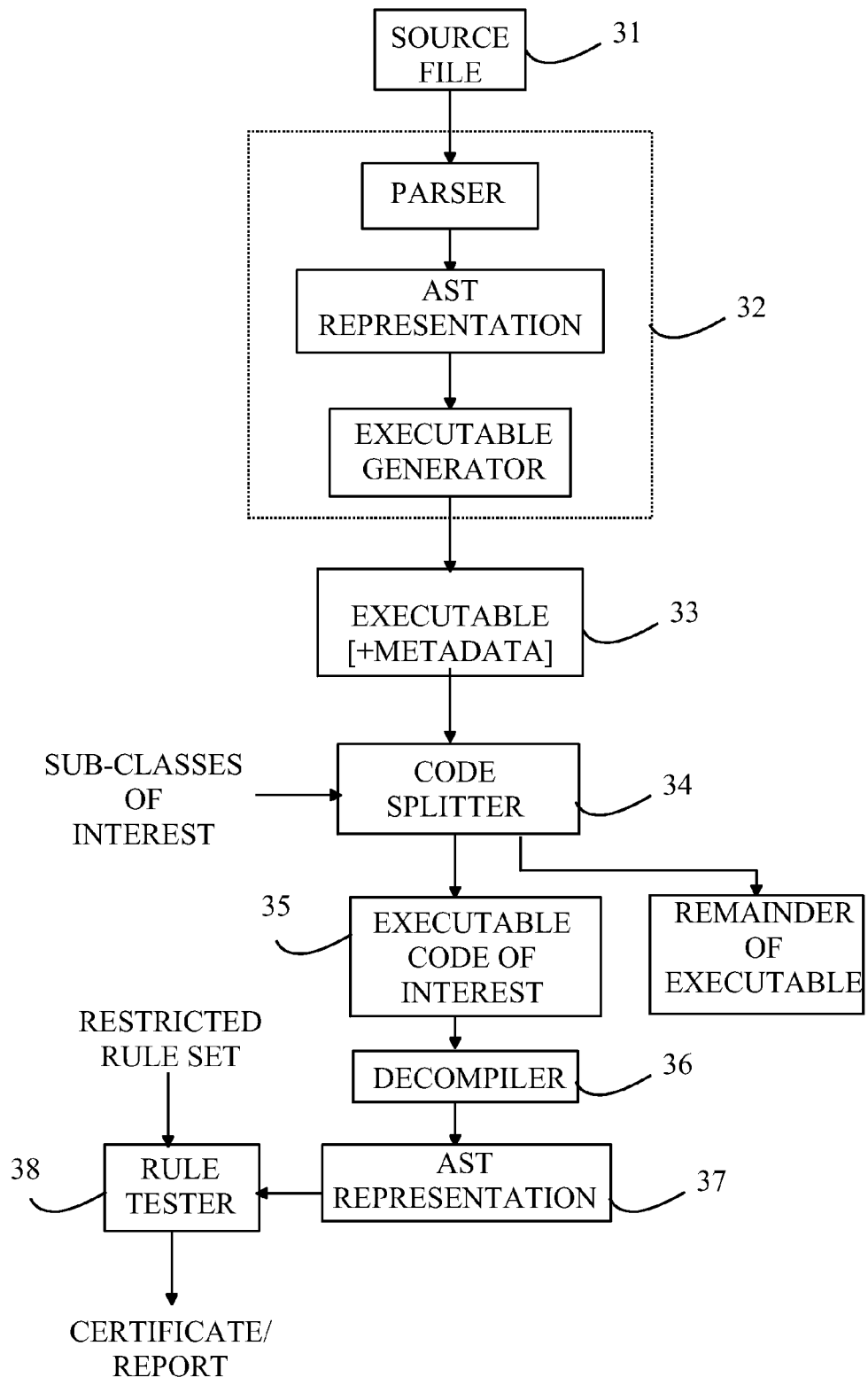

METHOD FOR ENFORCING LANGUAGE SUBSETS

BACKGROUND

Computer programs are typically written in a high level language that allows the user a wide range of instructions and freedom to write code that contains relatively few restrictions. Many programs rely on libraries of classes that are written by third parties. The programmer typically uses these routines directly or writes a sub-class of a class in the library. The author of the library routines has no control over the code that is written in the sub-class defined by the programmer using the library.

As computer programs become more complex, there are increasingly situations in which it is useful to restrict at least a portion of the code that can be written to a subset of the more general language. For example, consider a program that contains two threads that run in parallel on the computer. Consider a case in which the two threads use the same global variable within each thread, and that variable can be changed during the execution of the threads. Problems can arise if one of the threads assumes that the value of the variable is constant over the execution of that thread, since the thread cannot detect the change in the variable. The language in which the threads are written typically allows the programmer to write code that assumes that the variable is constant over the execution of the thread. Such code is clearly dangerous in the context of two parallel operating threads. Hence, it would be advantageous to restrict the code that can be written in this case to code that does not depend on a global variable remaining constant during the execution of the threads. For example, the code could be restricted such that it is not allowed to refer to any non-constant global variable in the sub-classes that execute parallel threads.

In general, the programmer is presented with a library that includes a collection of classes. The programmer either uses this library directly or defines sub-classes of the classes in the library. As noted above, the author of the library has no control over the code in the sub-classes. However, if a sub-class fails, the author of the library is often viewed as sharing the blame. Hence, it would be advantageous to provide a mechanism for enforcing a set of language restrictions on code that uses the library or sub-classes of that library.

SUMMARY

The present invention includes a method of operating a data processing system to examine a compiled program for violations of a set of rules that do not constitute violations detected by the compiler that generated the program. The method includes obtaining a restricted rule set defined in terms of rules in a decompiled representation of the program. The method also includes decompiling the compiled program to the decompiled representation of the compiled program in which the restricted rule set is defined, examining the decompiled representation of the compiled program for a violation of the restricted rule set to determine if any of the rules are violated, and providing an output indicating that one of the rules was violated.

One aspect of the decompiled representation includes an abstract syntax tree (AST) representation of a portion of the compiled program and the restricted rule set is defined in terms of the AST representation.

In another aspect of the invention, the restricted rule set only applies to a portion of the compiled program and decompiling the compiled program includes decompiling that portion of the compiled program while not decompiling another portion of the decompiled program.

In a still further aspect of the invention, the portion of the compiled program that is decompiled includes a set of sub-classes of a class, and decompiling the program includes identifying the location in the compiled program of instructions pertaining to the set of sub-classes.

In a further aspect of the invention, the compiled program further includes metadata that identifies locations in the compiled program of methods pertaining to the set of sub-classes, and a reflection mechanism is used to identify a method of the sub-class to be examined for the violation of the restricted rule set. In another aspect of the invention, different classes in the compiled program are subjected to different restricted rule sets.

In another aspect of the invention, the data processing system generates a certificate if the compiled program does not violate the restricted rule set. The certificate is readable by a runtime system that runs the compiled program. The runtime system can prevent the compiled program from running if the certificate is not present.

BRIEF DESCRIPTION OF THE DRAWING

FIG. 1 illustrates the flow of a rule testing procedure according to one embodiment of the present invention.

DETAILED DESCRIPTION

The present invention detects violations of a subset of language instructions in the computer code corresponding to a sub-class of a class provided in a library. The programmer typically writes the program as a source file in a high level language that allows the programmer to write sub-classes of a library that are recognized by a programming environment that includes some form of editor and a compiler. The program is then typically compiled to a form that is independent of the specific hardware on which the program is to operate. For example, this can be code to run on a virtual machine that can be implemented on a number of different hardware platforms. In another example, the compiled code is code to run on a particular hardware program. For the purposes of the present discussion, the compiled code is defined to be any executable file containing sequences of machine instructions, where the machine may be a real machine or a virtual machine. The compiled code also specifies a starting point in the sequence of instructions at which execution is to commence.

For the purposes of this discussion a "class" is defined to be the definition of a computer object having both data storage elements and code defining methods that operate on those storage elements. A sub-class is derived from a parent class by adding data storage elements and/or methods to the parent class that augment or alter the parent class. The added methods can override methods in the parent class or provide new methods that are not part of the parent class. Similarly, the sub-class can add additional data storage elements to those provided in the class.

In one aspect of the invention, a subset of the classes used in a program are identified as being restricted to a subset of the possible language commands and/or subject to a set of rules that are more restrictive than would be allowed by the compiler. To simplify the following discussion, such classes will be said to be required to conform to a "restricted rule set". Code for a sub-class that does not conform to a restricted rule set corresponding to the parent class from which it is sub-classed will be said to include language violations even though that code conforms to the rules enforced by the compiler.

In one aspect of the invention, the language violations are detected by a post-processor that operates on the code generated by a compiler. The post-processor approach has a number of advantages over enforcing the rules within the compiler used to compile the code. First, the post processor only operates on the output of the compiler, and hence, after the compilation has succeeded. Hence, the code checking does not have to handle semantically invalid programs or other types of language violations.

Second, the post-processor is insulated from the details of the manner in which the source files were combined during the compilation process. For example, different sub-classes in the program could be written in different computer languages. Hence, the post-processor does not need to work with a number of different source languages provided the post-processor can obtain the information needed from the compiler output.

Third, the post-processor, or the rules to be enforced, can be provided by the library supplier and utilized without requiring the cooperation of the entity that provides the compiler and programming platform. Hence, the rules can be customized to the library more easily, and provide a mechanism for the library provider to control the use of the library.

In one aspect of the invention, the output of the compiler is decompiled to generate a representation that is semantically equivalent to the original code that was compiled. Two representations are defined as being semantically equivalent if the code produced by the two representations produces the same results from the same inputs. For example, the compiler output could be converted to an AST, which is a tree representation of the abstract syntactic structure of the source code written in a programming language. The AST is then examined to find all of the classes or sub-classes that are subject to the restricted rules. Those sub-classes are then examined to determine if the sub-classes also conform to the restricted rule set. In this case, the restricted rule set is defined in terms of the structures in the particular AST representation.

If all of the classes in question conform to the restricted rule set or sets, the post processing program can issue a certificate that is recognized by the runtime environment and required for the program to be run with that runtime environment. The certificate could take the form of an additional property being added to the executable, or digitally signing it for example. Alternatively, or additionally, a warning can be provided to the programmer that the code does not satisfy the restricted rule set, and hence, could fail at runtime.

Typically, the number of classes that are restricted to the restricted rule set is a small percentage of the entire code in the program. Hence, if these classes can be identified in the compiled code without decompiling the entire program, a significant savings can be achieved in the computational workload. In another aspect of the present invention, the restricted rule set is enforced with respect to code that has been compiled by a compiler that provides data as to the location of the classes and methods within the compiled code. For example, Java and .NET compilers typically include metadata that can be used to identify the location and length of the code for each class within the compiled code as well as the parent class for each sub-class.

The manner in which such code splitting can be utilized to reduce the workload of enforcing the restricted rule set can be more easily understood with reference to FIG. 1, which illustrates the flow of a rule testing procedure according to one embodiment of the present invention. Typically, a source file 31 that is generated by a programming environment is compiled by a compiler 32. The compiler generates an AST representation of the source file program and compiles that representation to an executable file 33 that includes metadata that aids in the interpretation of the executable file. The extent of the metadata depends on the particular programming language. Compilers in the .NET and Java families of languages provide metadata that supports a reflection mechanism that allows a post compilation program to inspect the classes, interfaces, fields, and methods in the executable without knowing the names of the interfaces, fields, and methods. The reflection mechanism allows one to determine that a method exists, the arguments used by the method, and the result types generated by the method.

To obtain an AST representation of a method, the executable code for that method must be decompiled to generate the AST representation in question. Since the decompilation process is computationally intensive, it is advantageous to reduce the amount of code that must be decompiled. Accordingly, a code splitting routine 34 operates on the executable generated by compiler 32 to split off the executable code of interest 35 corresponding to the sub-classes of interest. A decompiler 36 then generates the AST representation 37 of the executable code of interest. AST representation 37 is then compared to the restricted rule set by a rule testing engine 38.

As noted above, the results of the post-processing can be utilized in a number of ways. In one aspect of the invention, the post-processor issues a "certificate" for the program indicating that the code in the program conforms to the restricted rule set in the relevant classes. The runtime environment in which the compiled program operates typically includes the libraries that have the parent class of the sub-classes in question. Those libraries can include code that checks for the certificate in question. If no certificate is provided, the library can issue a warning. Alternatively, the library could prevent the code from using the library, which could result in the termination of the operation of the program in question if a certificate is not detected.

In the above-described embodiment, the code splitter splits off the code corresponding to one or more sub-classes of interest. However, in some cases, the restricted rule set only applies to particular methods in those sub-classes. In such cases, the code splitter only splits off the code corresponding to those methods to further reduce the computational workload. It should also be noted that each class or method of interest can have a different restricted rule set that is applied for that class or method.

If the code does not conform to the restricted rule set, a violation can be reported. The report can include a readout for the program developer and a flag that is used to determine if a certificate is to be denied for the program being tested.

In another aspect of the invention, the post-processor merely provides a warning to the user if the sub-classes in question violate the restricted rule set. In this case, the post-processor provides the identity of the sub-classes that do not conform to the restricted rule set and information on the nature of the violation. The user can then correct the code accordingly or chose to run the compiled program knowing that problems could result. If the program fails to run correctly, the user will have an idea of where to look first when debugging the code.

It should be noted that different sub-classes of routines may have different restricted rule sets. That is, a first class could have a first restricted rule set and a second class could have a second restricted rule set. For example, in the case of a runtime library that provides the parent classes that are being sub-classed by the user code, authors of a particular class can specify the restricted rule set for that class and any classes derived from it. In addition, there may be different levels of restrictions for a particular class. In this case, some violations would give rise to warnings but the code would still be issued a certificate that would allow it to run.

The above-described embodiments assume that there is a single library that requires a restricted rule set. However, in some cases, a program may utilize a number of libraries, each with its own restricted rule set. In this case, the method of the present invention can be run multiple times, once for each library. The executable will then receive a certificate for each library. This multiple pass approach has the advantage of not requiring the user to generate a joint rule set for each combination of libraries. In one aspect of the invention, the rule set is supplied by the supplier of the libraries in question. Hence, the user does not need to actually generate the restricted rule set even in the case of multiple libraries.

The use of a post processor for enforcing the restricted rule set is particularly advantageous in situations in which the classes that are being sub-classed are from a library that is authored by an entity other than the entity that provides the compiler. In principle, the compiler could enforce the restricted rule set; however, to do this, the compiler must know the restricted rule set for each library routine. Since the classes in question are not part of the classes provided by the compiler supplier, there is no simple method for providing the relevant restricted rule set for each library class. In addition, using the compiler to enforce the restricted rule set requires the cooperation of the compiler supplier. In contrast, by using a post-processor that is provided by the library supplier, each library can enforce different restricted rule sets. Hence, the post processor approach of the present invention does not require the cooperation of the compiler supplier.

In the above-described embodiments, metadata from the compiler is used to reduce the amount of code that must be decompiled to verify that the restricted rule set has not been violated. Not all compilers provide such metadata. While the entire compiler output could be decompiled, such decompilation could be prohibitive for very large programs. Hence, some other mechanism for identifying the beginning and end of each class that is to be examined would be advantageous.

In one aspect of the present invention, the programmer creating the sub-classes of the library in question marks the code that sub-classes the library with a statement at the beginning and end of each sub-class that generates tags in the compiled code that can be detected by the post processor of the present invention. For example, particular instruction sequences that are not used elsewhere in the code and will not be executed in the current code could be included at the beginning and end of each sub-class. The post processor of the present invention would then search for these tags to generate the list of classes of interest that are included in the program.

The post processor of the present invention can be run on any data processing system having sufficient computational power to decompile the sections of code having the classes to be tested therein and to test the decompiled code against the restricted rule set. Such data processing systems are conventional in the art, and hence, will not be discussed in detail here. For the purposes of the present discussion, it is sufficient to note that such processors typically include a graphical user interface, a processing unit, and one or more storage devices.

The present invention also includes any computer readable medium that stores instructions that cause a computer reading that medium to execute the method of the present invention. For the purposes of the present discussion, any computer readable medium that qualifies as patentable subject matter under 35 U.S.C. 101 will be defined to be a computer readable storage medium. Such media include non-transitory storage media such as non-volatile memories, magnetic and optically-based disk drives and storage elements read by those disk drives.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. A method of operating a data processing system to examine a compiled program for violations of a set of rules that do not constitute violations detected by a compiler used to compile the compiled program, said method comprising:

obtaining a restricted rule set defined in terms of rules in a decompiled representation of said program, said restricted rule set prohibiting language commands that would otherwise be allowed by said compiler in a subset of classes in said compiled program while allowing said language commands in another class of said program;

decompiling said compiled program to said decompiled representation of said compiled program in which said restricted rule set is defined;

examining said decompiled representation of said compiled program for a violation of said restricted rule set to determine if any of said rules are violated; and providing an output indicating that one of said rules was violated, wherein said restricted rule set only applies to a portion of said compiled program and wherein decompiling said compiled program comprises decompiling said portion of said compiled program while not decompiling another portion of said compiled program, said portion of said compiled program comprising a set of sub-classes of a class, and wherein decompiling said program comprises identifying a location in said compiled program of instructions pertaining to said set of sub-classes, said data processing system generating a certificate if said compiled program does not violate said restricted rule set.

2. The method of claim 1 wherein said decompiled representation comprises an AST representation of a portion of said compiled program and said restricted rule set is defined in terms of said AST representation.

3. The method of claim 1 wherein said compiled program further comprises metadata that identifies locations in said compiled program of methods pertaining to said set of sub-classes.

4. The method of claim 3 wherein a reflection mechanism is used to identify a method of said sub-class to be examined for said violation of said restricted rule set.

5. The method of claim 1 wherein said restricted rule set includes a first restricted rule set to be applied to a first class within said program and a second restricted rule set to be applied to a second class within said program, said first restricted rule set being different from said second restricted rule set.

6. The method of claim 1 wherein said certificate is readable by a runtime system that runs said compiled program.

7. The method of claim 6 wherein said runtime system prevents said compiled program from running if said certificate is not present.

8. A non-transitory computer readable medium that includes instructions that cause a data processing system to examine a compiled program for violations of a set of rules that do not constitute violations detected by the compiler that compiled the compiled program using a method comprising:

obtaining a restricted rule set defined in terms of rules in a decompiled representation of said program, said restricted rule set prohibiting language commands that would otherwise be allowed by said compiler in a subset of classes in said compiled program while allowing said language commands in another class of said program;

decompiling said compiled program to said decompiled representation of said compiled program in which said restricted rule set is defined;

examining said decompiled representation of said compiled program for a violation of said restricted rule set to determine if any of said rules are violated; and providing an output indicating that one of said rules was violated, wherein said restricted rule set only applies to a portion of said compiled program and wherein decompiling said compiled program comprises decompiling said portion of said compiled program while not decompiling another portion of said compiled program, said portion of said compiled program comprising a set of sub-classes of a class, and wherein decompiling said program comprises identifying a location in said compiled program of instructions pertaining to said set of sub-classes, said data processing system generating a certificate if said compiled program does not violate said restricted rule set.

9. The computer readable medium of claim 8 wherein said decompiled representation comprises an AST representation of a portion of said compiled program and said restricted rule set is defined in terms of said AST representation.

10. The computer readable medium of claim 8 wherein said compiled program further comprises metadata that identifies locations in said compiled program of methods pertaining to said set of sub-classes.

11. The computer readable medium of claim 10 wherein a reflection mechanism is used to identify a method of said sub-class to be examined for said violation of said restricted rule set.

12. The computer readable medium of claim 8 wherein said restricted rule set includes a first restricted rule set to be applied to a first class within said program and a second restricted rule set to be applied to a second class within said program, said first restricted rule set being different from said second restricted rule set.

13. The computer readable medium of claim 8 wherein said certificate is readable by a runtime system that runs said compiled program.

14. The computer readable medium of claim 13 wherein said runtime system prevents said compiled program from running if said certificate is not present.

* * * * *

UNITED STATES PATENT AND TRADEMARK OFFICE
CERTIFICATE OF CORRECTION

| | | |
|---|---|---|
| PATENT NO. | : 9,436,452 B2 | Page 1 of 1 |
| APPLICATION NO. | : 13/674859 | |
| DATED | : September 6, 2016 | |
| INVENTOR(S) | : Mitchell | |

It is certified that error appears in the above-identified patent and that said Letters Patent is hereby corrected as shown below:

In the Claims

Column 7, Line 30: In Claim 8, delete "an output" and insert -- a certificate --.

Column 7, Line 30, In Claim 8, delete "one" and insert -- none --.

Signed and Sealed this
Third Day of January, 2017

Michelle K. Lee
*Director of the United States Patent and Trademark Office*